United States Patent

Sachs et al.

Patent Number: 5,909,890
Date of Patent: Jun. 8, 1999

[54] DEVICE FOR LOCKING AND UNLOCKING BICYCLE SUSPENSION SYSTEMS

[76] Inventors: Gregory D. Sachs, 27400 Pacific Coast Highway, Malibu, Calif. 90265; Richard K. Freshman, 4132 South Rainbow, No. 173, Las Vegas, Nev. 89103; Thomas J. Griffith, 20715 Dearborn St., Chatsworth, Calif. 91311

[21] Appl. No.: 08/712,299

[22] Filed: Sep. 11, 1996

[51] Int. Cl.⁶ .................................................. B62K 25/20
[52] U.S. Cl. ........................ 280/284; 188/300; 280/275
[58] Field of Search ................................. 280/284, 283, 280/275, 276, 272, 124.1, 124.109, 124.116, 124.125; 180/227; 267/64.12; 188/321.11, 300

[56] References Cited

U.S. PATENT DOCUMENTS

| | | | |
|---|---|---|---|
| 519,855 | 5/1894 | Whitaker | 280/283 |
| 2,880,451 | 4/1959 | Beck et al. | 188/300 |
| 4,582,343 | 4/1986 | Waugh | 280/284 |
| 4,811,983 | 3/1989 | Watts et al. | 188/300 |
| 4,890,703 | 1/1990 | Hathaway | 188/300 |
| 4,989,698 | 2/1991 | Dony | 267/64.12 |
| 5,320,375 | 6/1994 | Reeves et al. | 280/284 |
| 5,335,929 | 8/1994 | Takagaki et al. | 280/283 |
| 5,354,085 | 10/1994 | Gally | 280/285 |
| 5,370,411 | 12/1994 | Takamiya et al. | 280/284 |
| 5,409,249 | 4/1995 | Busby | 280/284 |

FOREIGN PATENT DOCUMENTS

| | | | |
|---|---|---|---|
| 933079 | 4/1948 | France | 280/284 |
| 3982 | 3/1887 | United Kingdom | 280/284 |

*Primary Examiner*—Anne Marie Boehler

[57] ABSTRACT

In a bicycle having a main frame, a wheel support frame pivotally attached to the main frame by a swing arm, and a suspension system coupled to the swing arm and the wheel support frame, a device for inhibiting the operation of the suspension system consisting of a body having a first end and a second end, the first end being pivotally attached to the swing arm and the second end being configured to detachably engage the main frame, such that when the second end of the body is engaged with the main frame, movement of the swing arm is substantially restricted.

In the bicycle, a method of inhibiting the operation of the suspension system consisting the steps of providing the body having the first end and the second end; mounting the first end such that the first end is pivotally attached to the swing arm; and, pivoting the body from a disengaged position to an engaged position such that when the second end of the body is engaged with the main frame, movement of the swing arm is substantially restricted.

6 Claims, 4 Drawing Sheets

DEVICE FOR LOCKING AND UNLOCKING BICYCLE SUSPENSION SYSTEMS

BACKGROUND OF THE INVENTION

1. Field of the Invention

The present invention relates to the field of use of suspension systems for bicycles. More particularly, the present invention relates to a device for locking and unlocking bicycle suspension systems.

2. Description of Related Art

Bicycles are two-wheeled vehicles designed to carry a rider (i.e., a "cyclist") over many types of surfaces. Specific adaptations of bicycles designed to handle rough terrain, known as "mountain bicycles", or "mountain bikes", usually have to travel over obstacles such as rocks, and logs, and also surface irregularities such as dips and holes. To enable better handling of mountain bikes and offer smoother rides to cyclists, suspension systems have been added.

These suspension systems typically include a liquid filled shock absorber and a coil spring disposed around the shock absorber. For a rear wheel suspension, the shock absorber/coil spring assembly is usually mounted between the main frame of the bicycle and the rear wheel support frame.

FIG. 1 illustrates a side view of the rear portion of a prior art mountain bicycle 2 having a main frame 4 with a seat post 5; a rear wheel support frame 6 for holding a rear wheel 8; and a suspension system 10 including a swing arm 12 pivotally connected to rear wheel support frame 6 and seat post 5 at pivot points 14 and 16, respectively; and a shock absorber/coil spring assembly 18 having a coil spring 20 and a shock absorber 22. The shock absorber/spring assembly 18 is pivotally connected to rear wheel support frame 6 and swing arm 12 at pivot points 24 and 26, respectively.

In FIG. 1, the path of travel of pivot point 14 is illustrated by a motion line 28. Also, the compression and expansion of shock absorber/coil spring assembly 18 (i.e., coil spring 20 and shock absorber 22) are illustrated by compression arrows "A'" 32 and expansion arrow "B'" 30, respectively.

When rear wheel 8 encounters an obstacle such as a log or a rock, causing rear wheel 8 to exert a force upward against rear wheel support frame 6, pivot point 14 will travel along path 28 in direction "A". As rear wheel support frame 6 is thus deflected, shock absorber/spring assembly 18 will be compressed as shown by compression arrows "A'" 32.

Conversely, when rear wheel 8 encounters a surface irregularity such as a hole or a dip, the expansion action of spring 20, as indicated by expansion arrows "B'" 30, will cause pivot point 14 to travel in direction "B" and rear wheel support frame 6 to travel in a downward direction.

As discussed below, shock absorber/coil spring assembly 18 can also be caused to compress and expand as illustrated by compression arrows "A'" 32 and expansion arrows "B'" 30, respectively, when, on smooth surfaces or riding uphill, a cyclist is exerting force on the pedals (not shown) to propel the bicycle. As a result, dipping would occur and efforts of the cyclist would also be inefficiently expended unnecessarily.

The oscillation of suspension system 10 occurs when a cyclist is riding on a smooth surface such as a paved road, as the pedaling motion of the cyclist will cause these suspension systems to oscillate. This oscillation effect is known as a "dipping effect", and results in the absorption of the pedaling efforts of the cyclist. The dipping effect occurs when suspension system 10, reacting to the forces exerted by the cyclist's pedaling motion, absorbs energy which otherwise would be put into propelling the bicycle.

Another problem with suspension systems such as suspension system 10 occurs under situations where the surface of the terrain is of a certain irregularity. Under these situations, suspension system 10 can also begin to oscillate. In cases where the oscillation becomes very great, loss of control of the bicycle by the cyclist can result, which in turn can cause serious injury and damage to both the cyclist and other property.

One solution that has been proposed for the problems mentioned above is to "lock out" or disable the rear suspension system in situations where the suspension system might interfere with the most efficient operation of the bicycle. These include the above-mentioned cases of smooth surface riding and also uphill riding.

One implementation of the solution is by inhibiting fluid flow between two or more chambers of a shock absorber contained in the suspension system (e.g., shock absorber 22), with the inhibiting device being integral to and located in the shock absorber. The control of the inhibiting device is achieved through the use of a cable connecting the inhibiting device and a lever mounted on the handlebars of the bicycle.

One example of this solution is contained in U.S. Pat. No. 4,582,343, "Light Weight Rear-Wheel Bicycle Suspension", issued to Waugh, on Apr. 15, 1986 (hereinafter Waugh). The device of Waugh contains a spring-loaded hydraulic shock absorber for damping the relative movement of a rear wheel of a bicycle. The hydraulic shock absorber incorporates a rider-controlled valve for hydraulically locking and unlocking the shock absorber, allowing the rear suspension to function both in a suspended mode and a rigid mode.

Other patents which have been issued and are directed at the same general concept include: U.S. Pat. No. 4,989,698, "Control Device for a Lockable Gas Spring", issued to Dony, on Feb. 5, 1991 (hereinafter Dony); and U.S. Pat. No. 5,320,375, "Interruptable Shock Absorber Suspension for Bicycles", issued to Reeves et al., on Jun. 14, 1994 (hereinafter Reeves).

Although the devices disclosed in Waugh, Dony, and Reeves function to inhibit the operation of a suspension system of a bicycle, to implement them would require extensive modification and/or the redesign of shock absorber 22 to include many parts. In addition, all three devices require a cyclist to actively sustain the inhibition of the suspension system—i.e., the cyclist must exert constant pressure on the lever mounted on the handlebars to control the inhibition of the operation of the shock absorber and thereby the suspension system.

Another solution that has been proposed is contained in U.S. Pat. No. 5,354,085, "Sprung Bicycle", issued to Gally, on Oct. 11, 1994 (hereinafter Gally), which is directed to a bicycle having a locking device for a suspension system where the locking device is being automatically actuated by a driving-force sensor. However, the Gally device also suffers from the same disadvantages as the Waugh, Dony, and Reeves devices as it also requires that the inhibiting device be located inside the shock absorber. In addition, the Gally device suffers from the additional disadvantage in that a cyclist cannot manually engage/disengage the inhibiting device, thereby preventing the cyclist from having full control of the inhibiting of the suspension system.

Therefore, what is desired is a device for inhibiting the operation of a suspension system which can be engaged and disengaged, as needed by a cyclist, and which does not require extensive modifications to existing suspension systems nor require the manufacture of complex assemblies.

SUMMARY OF THE INVENTION

In a bicycle having a main frame, a wheel support frame pivotally attached to the main frame by a swing arm, and a suspension system coupled to the swing arm and the wheel support frame, a device for inhibiting the operation of the suspension system consisting of a body having a first end and a second end, the first end being pivotally attached to the swing arm and the second end being configured to detachably engage the main frame, such that when the second end of the body is engaged with the main frame, movement of the swing arm is substantially restricted. In a preferred embodiment, the second end consists of a flange having a concave surface and the first end consists of a forked extension for mounting on the swing arm.

In the bicycle, a method of inhibiting the operation of the suspension system consisting the steps of providing the body having the first end and the second end; mounting the first end such that the first end is pivotally attached to the swing arm; and, pivoting the body from a disengaged position to an engaged position such that when the second end of the body is engaged with the main frame, movement of the swing arm is substantially restricted.

DETAILED DESCRIPTION OF THE INVENTION

The present invention provides an apparatus for locking and unlocking a bicycle suspension system. For purposes of explanation, specific embodiments are set forth to provide a thorough understanding of the present invention. However, it will be understood by one skilled in the art, from reading this disclosure, that the invention may be practiced without these details. Further, although the present invention is described through the use of mountain bicycle suspension systems, most, if not all, aspects of the invention apply to bicycle suspension systems in general. Moreover, well-known elements, devices, process steps and the like are not set forth in detail in order to avoid obscuring the present invention.

Figure 1:
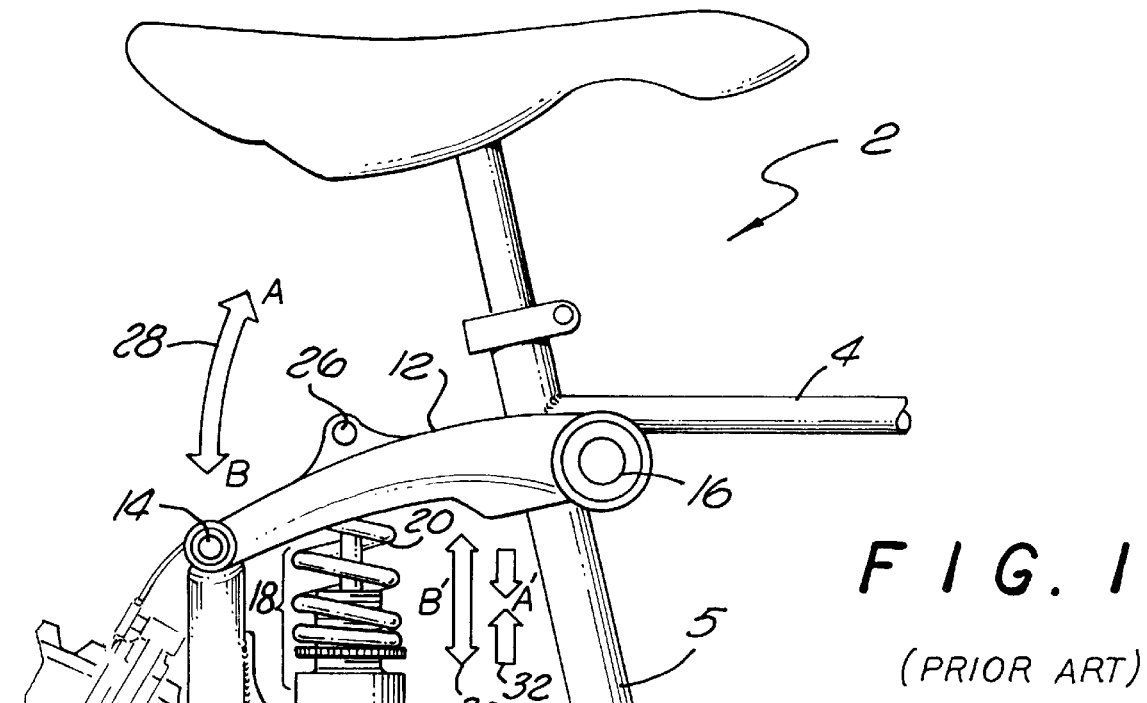
FIG. 1 is a side view of a rear portion of a prior art mountain bicycle having a suspension system.
Figure 2:
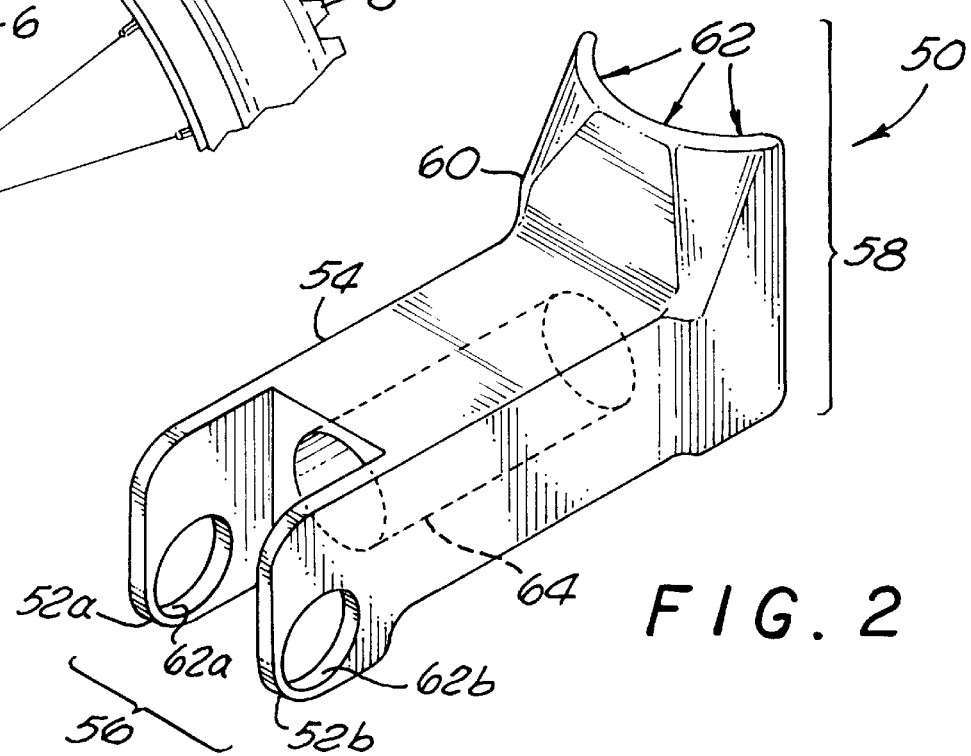
FIG. 2 is a perspective view of a suspension locking device configured in accordance with a preferred embodiment of the present invention.

FIG. 2 illustrates a preferred embodiment of a device 50 for locking and unlocking suspension system 10 of mountain bicycle 2. Device 50 consists of a body 54 having a first end 56 and a second end 58. First end 56 has two flanges 52a and 52b which are opposite and parallel to each other. Flanges 52a and 52b contain mounting holes 62a and 62b, respectively, for mounting device 50 to suspension system 10 of mountain bicycle 2. Moreover, as can be seen in FIG. 2, device 50 also has a second end 58 having a riser 60 which is substantially perpendicular to body 54. Second end 58 also has a concave surface 62 which is adapted for engagement with seat post 5 of mountain bicycle 2.

In a preferred embodiment, body 54 of device 50 also contains a hollow 64, running along the length of body 54. Hollow 64 is used to reduce the weight of device 50. In other embodiments, hollow 64 can be eliminated without significantly affecting the operation of device 50.

It is to be noted that the cross section of body 54 can be of any shape, although body 54 has a substantially rectangular cross section in the preferred embodiment.

Also, the material used to construct body 54 in the preferred embodiment is aluminum, which is either machined or cast to the desired shape. Other materials which possess the same rigidity and characteristics, such as steel and titanium, can be used. The sole requirement of the chosen material is that it possesses enough structural strength to withstand the stress imposed.

Figure 3:
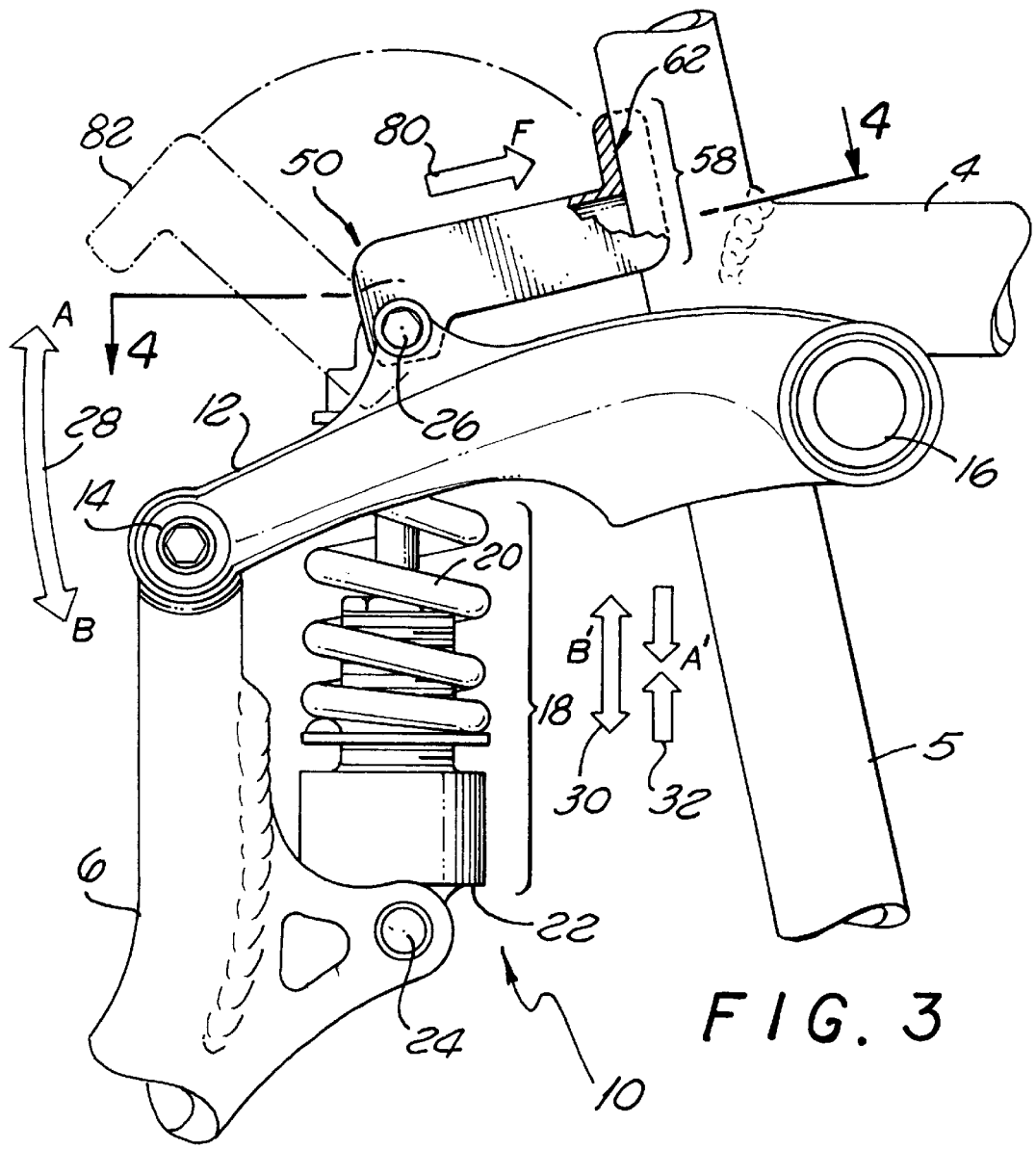
FIG. 3 is a side view of the preferred embodiment of the suspension locking device mounted in the prior art mountain bicycle of FIG. 1.

FIG. 3 illustrates device 50 having been attached to mountain bicycle 2 to inhibit the operation of suspension system 10. Device 50 is attached to mountain bicycle 2 through the use of mounting holes 62a and 62b and pivot point 26 of swing arm 12. Device 50 operates by having concave surface 62 of second end 58 being engaged with seat tube 5, thereby transferring forces directed to swing arm 12 through device 50 to seat tube 5.

Once engaged, device 50 will prevent shock absorber/coil spring assembly 18 (i.e., coil spring 20 and shock absorber 22) from being compressed (as shown by compression arrows 32) when pivot point 14 wants to travel in direction "A" of motion line 28. Thus, device 50 translates the rotational movement of pivot point 14 in direction "A" into a translational movement, as shown by a force line "F" 80 and prevents pivot point 14 from rotational movement.

Also illustrated by a dashed outline 82 in FIG. 3 is a disengaged position of device 50 which allows suspension system 10 to operate normally. When device 50 is placed by a cyclist into the position as shown by dashed outline 82, suspension system 10 will operate as it did before the installation of device 50. Device 50 will be held into place by friction.

Figure 4:
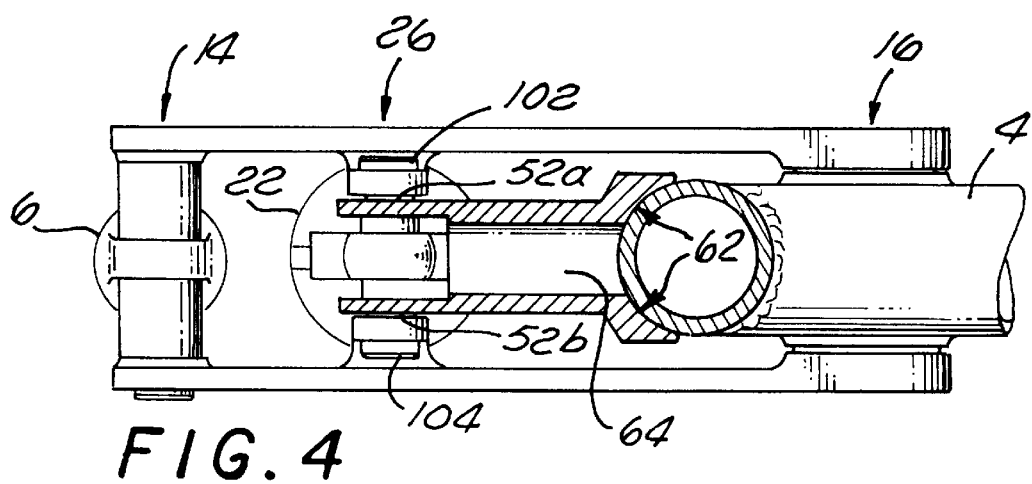
FIG. 4 is a view taken on line 4—4 of FIG. 3.

FIG. 4 illustrates a view taken along line 4—4 in FIG. 3. As illustrated in FIG. 4, device 50 is secured to swing arm 12 (and shock absorber 22 of suspension system 10) through the use of a nut 102 and a bolt 104. It can also be seen in FIG. 4 that concave surface 62, in the preferred embodiment, has been adapted to engage seat post 5 with the least amount of spacing between second end 58 of device 50 and seat tube 5, as possible.

Figure 5:
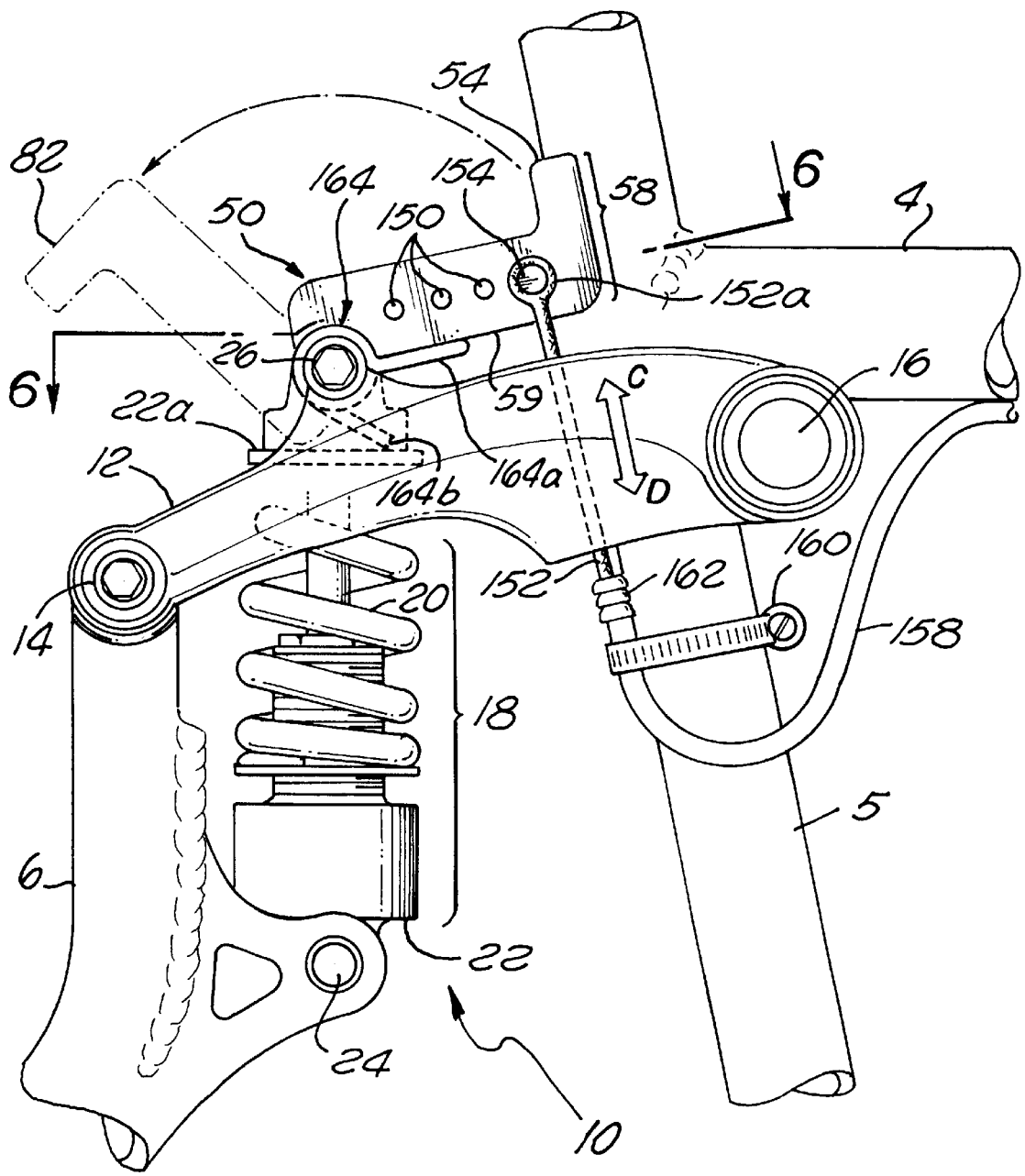
FIG. 5 is a side view of another embodiment of the suspension locking device mounted in the prior art mountain bicycle of FIG. 1.

FIG. 5 illustrates another embodiment of the present invention configured to allow a cyclist to manually engage and disengage device 50 through the use of a control lever (not shown) mounted on the handlebars (not shown) of mountain bicycle 2. The control lever is of a type that is well known in the art, such as the type used for operating a bicycle brake.

Figure 6:
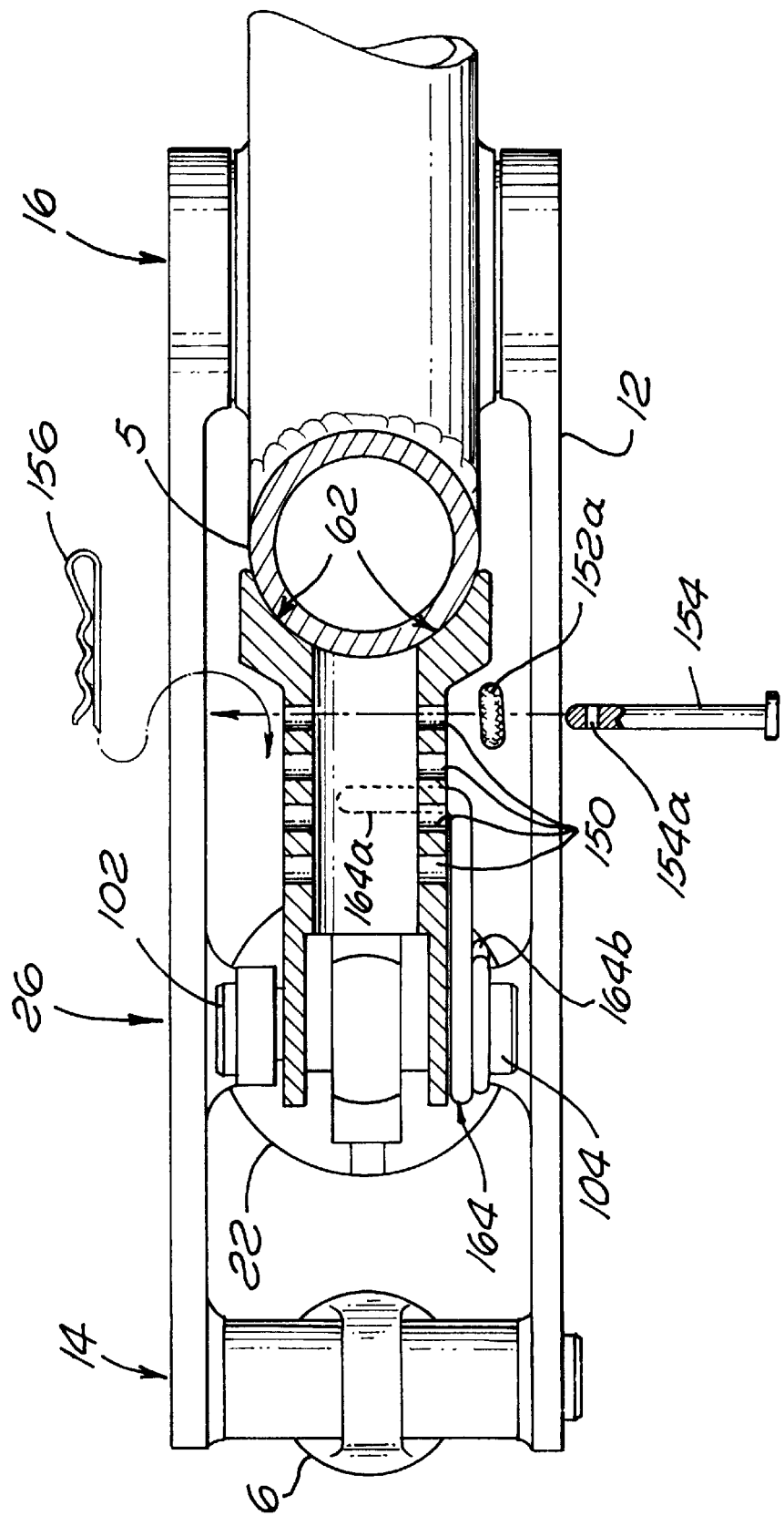
FIG. 6 is a view taken on line 6—6 of FIG. 5.

In this embodiment, device 50 contains a set of mounting holes 150 for attaching a looped end 152a of a control cable 152 through the use of a mounting pin 154 and a hairpin 156 (shown in FIG. 6.

Control cable 152 is contained in cable housing 158, which is attached to seat tube 5 through the use of a screw clamp 160. First end 152a of control cable 152 exits cable housing 158 through a cable housing stop 162. Cable housing 158 is also attached to main frame 4 and the handlebars through the use of other screw clamps (not shown). As discussed above, the second end of control cable 152 is attached to the control lever on the handlebars of mountain bicycle 2.

In this alternate embodiment, device 50 is also connected to a pre-loaded disengagement spring 164 which is wound around pivot point 26 and has a first end 164a pressing against an underside 59 of device 50 and a second end 164b pressing against a top surface 22a of shock absorber 22.

FIG. 6 illustrates a view taken along lines 6—6 of FIG. 5 wherein mounting pin 154 is first inserted through looped end 152a of control cable 152, through two opposing mounting holes 150, and secured by hairpin 156 being inserted into hairpin mounting hole 154a in mounting pin 154.

In FIG. 6, it can be seen that first end 164a of pre-loaded disengagement spring 164 is engaged underneath device 50 so as to provide the necessary force to disengage device 50 and bring it into the position as shown by dashed outline 82 in FIG. 5, as described below. Second end 164b of pre-loaded disengagement spring 164 rests on top surface 22a of shock absorber 22 and is stationary.

Referring again to FIG. 5, the operation of the alternate embodiment of device 50 will be described.

As illustrated in FIG. 5, device 50 is in a position to inhibit the operation of suspension system 10. In a preferred operation of the alternate embodiment, device 50 is forced into the "locking position" by the user causing control cable 152 to move in direction "D" until second end 58 of body 54 is engaged with seat post 5. Thus, as device 50 is being moved into the inhibiting position, pre-loaded disengagement spring 164 is being compressed such that first end 164a of pre-loaded disengagement spring 164 is brought towards second end 164b of pre-loaded disengagement spring 164.

When the cyclist wishes to allow suspension system 10 to operate (e.g., when the cyclist is preparing to ride downhill, thus requiring the use of suspension system 10) the cyclist will release the lever controlling control cable 152 and allow looped end 152a of control cable 152 to move in direction "C". Device 50 will be forced into the position indicated by dashed outline 82 by the expansion of pre-loaded disengagement spring 164 where first end 164a of pre-loaded disengagement spring 164 will move away from second end 164b of pre-loaded disengagement spring 164. Thus, first end 164a of pre-loaded disengagement spring 164 will push up against the underside of device 50 while second end 164b of pre-loaded disengagement spring 164 will push against top surface 22a of shock absorber 22 to force device 50 to the position indicated by dashed outline 82.

It is to be noted that the spring constant of pre-loaded disengagement spring 164 can be of varying degrees such that the cyclist can vary the force required to bring device 50 from a locked to an unlocked position simply by selecting a pre-loaded disengagement spring having a required spring constant.

It is also to be noted that the cyclist can adjust the amount of travel of control cable 152 (and thereby adjust the amount of travel of the control lever), by selecting an appropriate pair of mounting holes in set of mounting holes 150.

Therefore, both the amount of travel and the force necessary to move the control lever can be adjusted by using a specific pair of mounting holes in the set of mounting holes 150 and a pre-loaded disengagement spring with a desired spring constant, respectively.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. In a bicycle having a main frame, a wheel support frame pivotally attached to said main frame by a swing arm, and a suspension system coupled to said swing arm and said wheel support frame, a device for inhibiting the operation of said suspension system comprising:

a body having a first end and a second end, said first end being pivotally attached to said swing arm and said second end having a flange being detachably engaged to said main frame, such that when said second end of said body is engaged with said main frame, movement of said swing arm is substantially restricted.

2. The inhibiting device in the bicycle as claimed in claim 1, wherein said flange has a concave surface.

3. The inhibiting device in the bicycle as claimed in claim 1, wherein said first end has a forked extension for mounting on said swing arm.

4. The inhibiting device in the bicycle as claimed in claim 1, wherein:

said body further includes a first side and a second side, said first side configured to engage a spring member; and a cable having a first end detachably coupled to said second side of said body, such that when said first end of said cable is in a first position, said spring member is compressed and said second end of said body will be engaged with said main frame.

5. The inhibiting device in the bicycle as claimed in claim 4, wherein when said first end of said cable is in a second position, said spring member is uncompressed and said second end of said body will be substantially disengaged from said main frame.

6. A method of inhibiting the operation of a suspension system of a bicycle having a main frame, a wheel support frame pivotally attached to said main frame by a swing arm, and a suspension system coupled to said swing arm and said wheel support frame, said method comprising the steps of:

providing a body having a first end and a second end, said second end being configured to detachably engage said main frame;

mounting said first end such that said first end is pivotally attached to said swing arm;

pivoting said body from a disengaged position to an engaged position such that when said second end of said body is engaged with said main frame, movement of said swing arm is substantially restricted; and, wherein said body further includes a first side and a second side, said first side configured to engage a spring member; and a cable having a first end detachably coupled to said second side of said body, said pivoting step further including the step of:

adjusting said cable, such that when said first end of said cable is in a first position, said spring member is compressed and said second end of said body will be engaged with said main frame.

* * * * *

UNITED STATES PATENT AND TRADEMARK OFFICE
CERTIFICATE OF CORRECTION

PATENT NO. : 5,909,890
DATED : June 8, 1999
INVENTOR(S) : Sachs et al.

It is certified that error appears in the above-identified patent and that said Letters Patent is hereby corrected as shown below:

<u>Title page,</u>
After reference to *"Primary Examiner"* please insert -- [74] *Attorney, Agent, or Firm* - Blakely Sokoloff Taylor & Zafman LLP --.

Signed and Sealed this

Eleventh Day of December, 2001

*Attest:*

*Attesting Officer*

NICHOLAS P. GODICI
*Acting Director of the United States Patent and Trademark Office*